United States Patent [19]

Bozenmayer et al.

[11] Patent Number: 5,667,679

[45] Date of Patent: Sep. 16, 1997

[54] FILTER HAVING A FILTER ELEMENT QUICK-DISCONNECT MOUNT

[75] Inventors: Kurt Bozenmayer, West Milford, N.J.; Peter Sciandra, Elkton, Md.

[73] Assignee: Graver Chemical Company, Glasgow, Del.

[21] Appl. No.: 669,180

[22] Filed: Jun. 24, 1996

[51] Int. Cl.⁶ .................................................. B01D 29/17
[52] U.S. Cl. ........................ 210/232; 210/238; 210/323.2
[58] Field of Search ................................ 210/232, 236, 210/238, 322, 323.1, 323.2, 324, 329, 497.01

[56] References Cited

U.S. PATENT DOCUMENTS

| | | | |
|---|---|---|---|
| 2,543,165 | 2/1951 | Harlan | 210/131 |
| 2,889,933 | 6/1959 | Brundage | 210/541 |
| 2,914,179 | 11/1959 | Foust . | |
| 3,279,608 | 10/1966 | Soriente et al. | 210/232 |
| 3,405,807 | 10/1968 | Burkhardt | 210/232 |
| 3,615,016 | 10/1971 | Soriente et al. | 210/232 |
| 3,814,256 | 6/1974 | McGovern . | |
| 4,174,282 | 11/1979 | Butterworth | 210/232 |
| 4,210,537 | 7/1980 | Butterworth et al. . | |
| 4,522,717 | 6/1985 | Brust | 210/323.2 |
| 5,209,844 | 5/1993 | Zievers et al. | 210/232 |
| 5,376,278 | 12/1994 | Salem | 210/679 |

Primary Examiner—W. L. Walker
Attorney, Agent, or Firm—Dressler, Rockey, Milnamow & Katz, Ltd.

[57] ABSTRACT

A liquid filter having a quick-disconnect filter element mount includes a filter vessel having an inlet nozzle and an outlet nozzle. The vessel has a tube sheet which spans across at least a part of the vessel and defines an influent chamber in communication with the inlet nozzle and a filtrate chamber in communication with the outlet nozzle. A plurality of support core elements are connected to the tube sheet at a fixed end. A free end of the core elements extends into the influent chamber and includes a retaining barrel mounted to the free end. Filter elements, such as cartridge type elements which have a central opening therein are positioned on the core elements, against the tube sheet. The quick disconnect mount includes a post having a retaining body adapted to be releasably connected to the retaining barrel in the support core, to retain the filter element in place on the support core, in engagement with the tube sheet. The quick-disconnect mount includes a spring element and at least one tensioning element to provide a predetermined, settable pre-load compression on the filter element when the mount is positioned with the filter element in place on the support core. The quick-disconnect can be configured for use with up-flow and down-flow type filter vessels and is configured to readily permit removal and replacement of the filter elements.

7 Claims, 2 Drawing Sheets

FILTER HAVING A FILTER ELEMENT QUICK-DISCONNECT MOUNT

FIELD OF THE INVENTION

This invention pertains to a liquid filter and more particularly to a a liquid filter having a quick-disconnect filter element mount assembly which minimizes the time and tools necessary to replace filter elements, and which retains all of the components thereof in a unitary assembly.

BACKGROUND OF THE INVENTION

Filters having replaceable filter cartridges are well known in the art. An exemplary filter having a tank or vessel with replaceable filter cartridges is disclosed in Soriente et al., U.S. Pat. No. 3,279,608. Such filters are used in numerous industries to filter liquid streams of particulate and dissolved matter. Generally, the filter vessels have an inlet nozzle and an outlet nozzle. A typical vessel includes a tube sheet which spans across at least a portion of the vessel and defines an influent chamber in communication with the inlet nozzle and a filtrate chamber in communication with the outlet nozzle.

In a typical arrangement, cores or sepia extend from the tube sheet into the influent chamber. When used with filter cartridges, a cartridge is positioned on and mounted to the core. A detailed description of the operation of such a filter vessel is disclosed in the aforementioned patent to Soriente et al., which patent is incorporated herein by reference.

Filter vessel configurations are generally of two types, upflow and downflow-type vessels. In a downflow-type vessel, the septa extend upwardly from the tube sheet and the flow is into the vessel from an upper nozzle, downward through the filter elements and out of the vessel through a lower nozzle. Conversely, in an upflow-type vessel, the septa extend downwardly or depend from an upper tube sheet or bulkhead. The flow is into the vessel through a lower nozzle, upward through the filter elements and out of the vessel though an upper nozzle.

In order to remove or install the filter cartridges, it is necessary for personnel to reach into the vessel to remove a mounting assembly which holds the cartridge in place. Some known assemblies consist of many small parts which must be carefully handled to prevent dropping parts into the filter vessel while removing the mount. Other known assemblies require performing some task near the base of the cartridge to remove the cartridge from the core and the vessel.

In most instances, these tasks are not hazardous. However, when the filter is used in toxic or radioactive systems, not only may the environment be hazardous, but the time permissibly spent in the location and in the vessel may be severely limited. Numerous devices have been developed in order to facilitate remote removal of the filter mount and associated filter. These devices, however, often require the use of highly specialized tools which are not readily available. An example of such a device is disclosed in U.S. Pat. No. 3,664,003 to Wapner et al. This device works well in certain applications, however, it requires the use of a lift plate which remains in the tank during operation.

Other apparatus which facilitate filter cartridge removal are disclosed in U.S. Pat. Nos. 4,174,282 to Butterworth and 4,210,537 to Butterworth et al. These apparatus also operate quite well and permit quick filter element removal. However, the mounting assembly is located at or near the tube sheet which may, in certain instances, make filter cartridge removal and replacement and mount assembly maintenance a difficult and time consuming task.

Another mounting assembly is disclosed in U.S. Pat. No. 2,914,179, to Foust. The device disclosed in Foust includes a spring which is set into a filter element mount, between a plate and a fixed collar.. Thus, the assembly of Foust does not appear to provide the capability to adjustably pre-load the filter element with a predetermined compressive load to assure that the filter will remain in place during operation.

Thus, there continues to be a need for liquid filter having a quick-disconnect filter element mounting assembly which assembly is readily accessible from an opening in the vessel at a distance from the tube sheet, which utilizes a minimum number of parts and which facilitates rapid, tool-less removal and replacement of filter elements.

SUMMARY OF THE INVENTION

A liquid filter having a filter element quick disconnect mount is disclosed for mounting a filter element, such as a cartridge filter element to a support core in a filter vessel. The filter includes a vessel having a tube sheet which spans across at least a portion of the vessel and defines an influent chamber and a filtrate chamber. The filter element defines a central opening therein, extending longitudinally therethrough.

A plurality of support core elements extend from the tube sheet into the influent chamber. The core elements are connected to the tube sheet at a fixed end. A free end extends into the influent chamber. Each of the support core elements includes a retaining barrel mounted thereto at the free end. The retaining barrel defines a generally cylindrical shaped annular opening therethrough. A pair of hook-shaped or S-shaped notches are formed in the barrel.

The quick-disconnect mounting assembly retains the filter element in place in the vessel, in engagement with the tube sheet, and facilitates quick removal and replacement of the filter element by providing a tool-less assembly which engages and disengages from the core by a press-and-rotate procedure. The quick-disconnect assembly includes a post having a generally cylindrical retaining body mounted to one end thereof. The retaining body is adapted to be received in the retaining barrel mounted to the free end of the core support. The retaining body includes a pair of pin-like projections extending therefrom that are adapted to be received in and engaged by the notches in the barrel member.

An inner seat plate is positioned on the post, adjacent to the retaining body. The inner seat plate is configured to engage the filter element to provide a compressive force thereon to maintain the element against the tube sheet. A seal member is positioned on the post, adjacent to the inner seat plate, to form a seal between the filter element central opening and the post. A spring seat is positioned on the post, adjacent to the seal member and a biasing element, such as a coil spring, is positioned on the spring seat.

An outer seat plate is positioned on the post and is adapted to hold the biasing element in place on the post. A tensioning element, such as a coupling nut is threadedly engaged on the post, positioned adjacent to the outer seat plate, to retain the mount as a unitary assembly, and to maintain the assembly in a compressed state when it is installed on a respective support core.

Advantageously, the present mount may also be used to provide a preset pre-load compression on the falter element when the assembly is in place. This permits "one time" setting of the of the assembly in compression on the filter element, with periodic adjustment, to exert the required compressive force on the filter element necessary to retain the element in place and for proper functioning of the filter system.

In use, a filter element is positioned on the support core element and the quick-disconnect assembly is positioned with the retaining body over the barrel. The retaining body is inserted into the barrel and rotated so that the retaining body and barrel engage one with the other to retain the filter element in place with the proper pre-load on the filter element.

In one embodiment, the quick-disconnect assembly is used to mount filter cartridges to a support core in an downflow-type filter vessel. In such an arrangement, the filter elements are removed from the vessel by removing the quick-disconnect assembly and upwardly urging the elements from the vessel. In this configuration, the quick-disconnect assembly is accessed from the above the elements.

An alternate embodiment of the quick-disconnect assembly is used to mount filter elements in an upflow-type filter vessel. In such a vessel, the filter elements are mounted to support cores which depend from an upper tube sheet. The quick-disconnect assembly is positioned at the lower end of the filter elements and may be removed from its respective support core by use of an extended handle removal tool which is adapted to threadedly engage the body of the quick-disconnect mount.

Other features and advantages of the present invention will be apparent from the following detailed description, the accompanying drawings, and the appended claims.

DETAILED DESCRIPTION OF THE PREFERRED EMBODIMENTS

Figure 1:
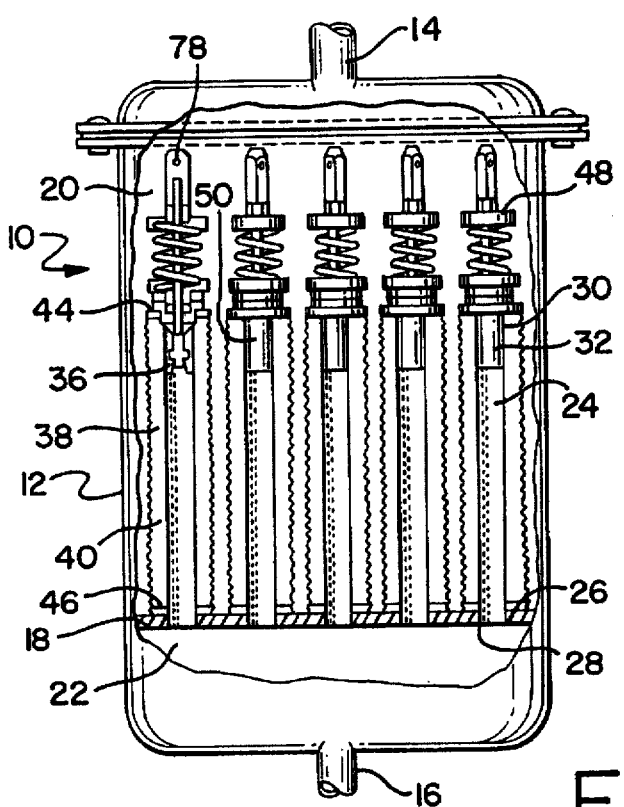
FIG. 1 is an elevational view of an exemplary down flow filter vessel, having a plurality of filter elements therein, and having a portion of the vessel side wall removed for clarity of illustration, showing a quick-disconnect mount in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

With reference to FIG. 1, there is shown a downflow-type liquid filter 10 having a filter vessel 12 which includes an inlet nozzle 14 and an outlet nozzle 16. A tube sheet 18 spans across at least a part of the vessel 12 and defines an influent chamber 20 and a filtrate chamber 22. The influent chamber 20 is in communication with the inlet nozzle 14, and the filtrate chamber 22 is in communication with the outlet nozzle 16. The exemplary filter vessel 12 is of the down-flow type, that is, the liquid flows in through the inlet at the top of the vessel and flows out of the outlet at the bottom of the vessel 12. It will be recognized by those skilled in the art that the flow direction and thus the respective chamber and nozzle locations can be reversed.

The filter 10 includes a plurality of elongated support core elements 24 extending from the tube sheet 18 into the influent chamber 20. The support core elements 24 are connected to the tube sheet 18, illustrated at 28, at a fixed end 26. The core elements 24 are connected to the tube sheet 18 by threaded connections, welding or the like. Such methods of connecting the support core elements 24 to the tube sheet 18 will be recognized by those skilled in the art. A free end 30 of the core 24 is distal most from the tube sheet 18 and extends into the influent chamber 20.

In one embodiment, the core elements 24 include a tube-like member 32 having openings 34 therein, or a foraminous member. The openings 34 permit the flow of liquid therethrough. In another embodiment (not shown), the core element may include a solid body portion having a flow space therearound. The core element 24 includes a barrel member 36 at the free end 30. The barrel member 36 defines a generally cylindrical annular space 37 therethrough.

The filtering medium includes a filter element 38, such as a pleated cartridge filter. The filter element 38 has an elongated body 40 which is formed of a porous material which may have a predetermine pore size or range of pore sizes. Each filter element 38 has a ring 44, 46 positioned at a respective end to facilitate establishing a seal between the element 38 and the tube sheet 18 at one end and between the element 38 and a quick disconnect mount 48 at the other end. The filter element 38 has a central opening 50 therein which is adapted to receive the support core 24. An exemplary filter element 38 is that disclosed in U.S. Pat. No. 5,376,278 to Salem, which patent is commonly assigned wherewith. The filter element is available from the Graver Chemical Company of Glasgow, Del.

Figure 2:
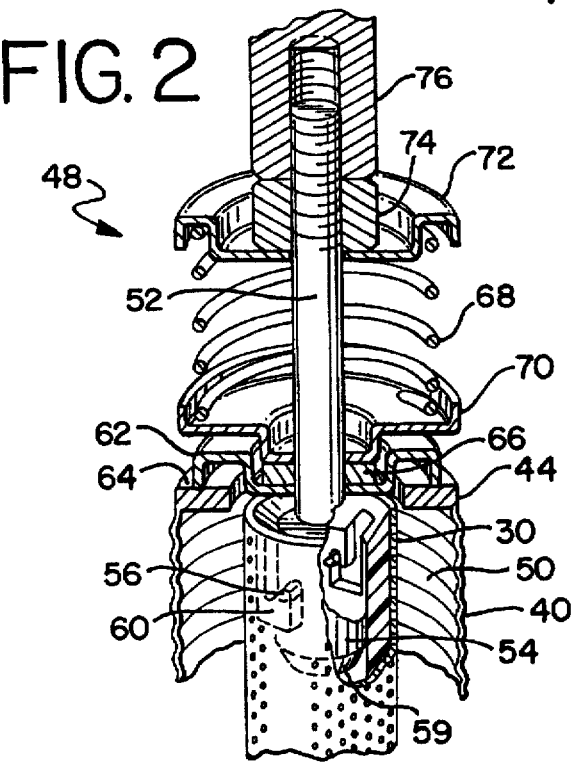
FIG. 2 is a perspective view, shown in partial cross-section, of the quick disconnect filter mount.
Figure 3:
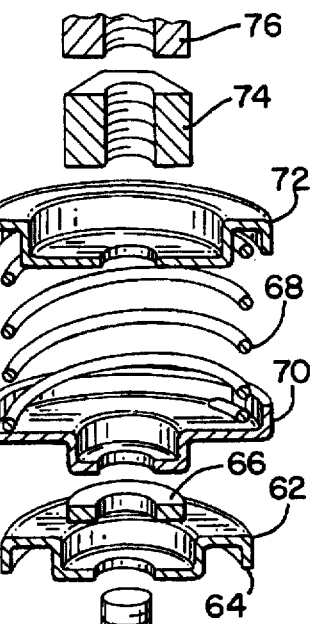
FIG. 3 is an exploded view, shown with various components in partial cross-section, of the quick disconnect falter mount of FIG. 2.
Figure 3:
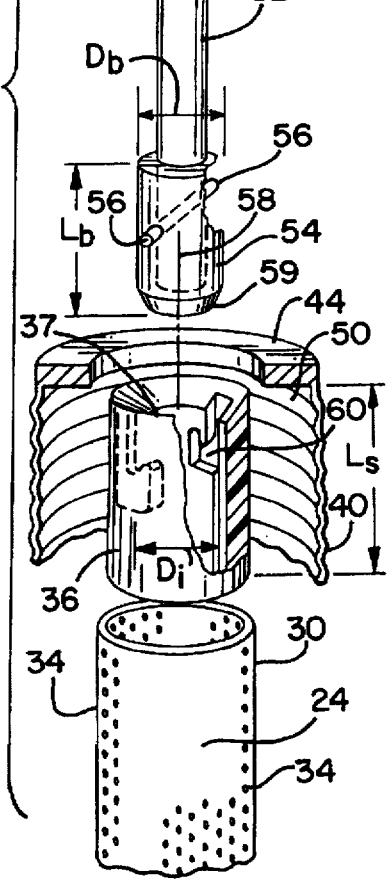

A first embodiment of the quick-disconnect mount 48, which is best seen in FIGS. 2 and 3, securely and releasably mounts the filter element 38 to the support core 24, retaining the filter element 38 in place thereon, and in engagement with the tube sheet 18. Additionally, the mount 48 facilitates tool-less removal and replacement of the filter element 38 while minimizing the risk of losing parts in the filter vessel 12. Advantageously, this arrangement may also reduce the time necessary to remove and replace filter elements 38, thereby reducing personnel exposure to hazardous environments.

The quick-disconnect assembly 48 includes an elongated post 52, such as a threaded stuff, having a retaining body 54 positioned on an end thereof. In one embodiment, the retaining body 54 has a generally cylindrical shape and has a pair of pin-like projections 56 extending therefrom, generally transverse to the longitudinal axis of the retaining body, shown at 58. The body 54 includes a bevelled portion 59 at a distal end thereof to facilitate insertion into the barrel member 36.

The retaining body 54 is adapted to be releaseably received in the barrel member 36 at the free end 30 of the support core 24. In this configuration, as best seen in FIGS. 2 and 3, the barrel 36 has a pair of notches 60 formed therein, such as the exemplary hook-shaped or S-shaped notches, adapted to engage the pins 56.

The quick disconnect assembly 48 is biased to retain the filter element 38 in place in engagement with the tube sheet 18, and to provide a preset "pre-load" compression on the filter element 38. The pre-load may be set one time, during the initial installation of a filter element 38, and can be left for prolonged periods of filter 10 operation, with the assurance that the filter element 38 has the proper compressive force exerted on it to retain it in place in the vessel 12 and to maintain the appropriate seals between the filter element 38 and the tube sheet 18 and the filter element 38 and the mount assembly 48.

Advantageously, the present quick disconnect filter mount 48 may be removed and the filter element 38 replaced, with confidence that the previously set pre-load compression is set for proper functioning of the filter element 38 and the filter system.

The quick-disconnect assembly 48 further includes an inner seat plate 62, positioned on the post 52. The inner seat plate 62 has a rim 64 which is configured to engage the filter element ring 44, and to exert a compressive force on the element ring 44 to form a seal therebetween. Consequently, when the inner seat plate 62 is compressed against the ring 44, it also exerts a force on the filter element 38 retaining it in place in engagement with the tube sheet 18.

The quick-disconnect assembly 48 further includes a seal member 66, such as a gasket, positioned on the post 52, adjacent to the seat plate 62. The seal member 66 seals the area around the connection between the post 52 and seat plate 62, and prevents leakage of fluid into the central opening 50 of the filter element 38. The assembly 48 also includes a biasing member, such as a coil spring 68, positioned on the post 52, to provide a constant or settable compressive load on the filter element 38.

The spring 68 is retained in place on the post 52 by a spring seat 70 adjacent to the seal member 66 and the inner seat plate 62 at one end of the spring 68, and an outer seat plate 72 positioned at the other end of the spring 68, enclosing the spring 68 ends. Tensioning elements, such as a coupling nut 74 and an extension nut 76 may be threaded onto the post 52, adjacent to the outer seat plate 72. The coupling nut 74 and extension nut 76 permit the assembly 48 to be readily set at the proper pre-load compression to be exerted on the filter element 38 during operation. The extension nut 76 may have an opening 78 therein to accommodate a hook or like lifting and storing device (not shown).

Removal of the filter element 38 is readily accomplished by applying pressure on the assembly 48 toward the tube sheet 18 and rotating the assembly 48 until the pins 56 disengage from the notches 60. The assembly 48 can then be lifted from the filter element 38 and support core 24, and the filter element 38 can simply be slid off of the core 24.

To replace the filter element 38, the opposite procedure is followed. The filter element 38 is slid onto the core 24, to rest against the tube sheet 18. The assembly 48 is placed over the filter element 38 with the retaining body 54 in alignment with the core 24 and barrel 36. The pins 56 on the body 54 are aligned with the notches 60 and pressure is applied on the assembly 48 until the pins 56 reach the bottom of the notches 60. The assembly 48 is then rotated until the pins 56 lock into the notches 60.

In order to provide additional stability to the retaining body 54 to barrel 36 connection, it is preferred that the axial length of the inside diameter $L_a$ is about equal to the length $L_b$ of the body 54. This provides a stabilizing length that precludes tilting of the post 52 and the assembly 48. In a current embodiment, the overall length of the retaining body 54 is about 1.25 inches and the diameter is about 0.625 inches. The overall length of the barrel member 36 is about 1.5 inches.

Unlike known filter element mounting assemblies, the present assembly 48 permits quick, one-handed removal of the assembly 48. Advantageously, all of the component parts of the assembly 48 are retained on the post 52 when the assembly 48 is removed from the core support 24. Thus, the opportunity to lose or misplace small parts, which are common in known mounts, is greatly reduced, and assurance that the filter element 38 will be properly installed, under the proper pre-load is greatly enhanced.

As will be readily appreciated by those skilled in the art, the present quick-connect assembly 48 can be used with a down-flow type filter vessel 12 arranged with the core elements 24 extending upward as illustrated in the figures.

Figure 4:
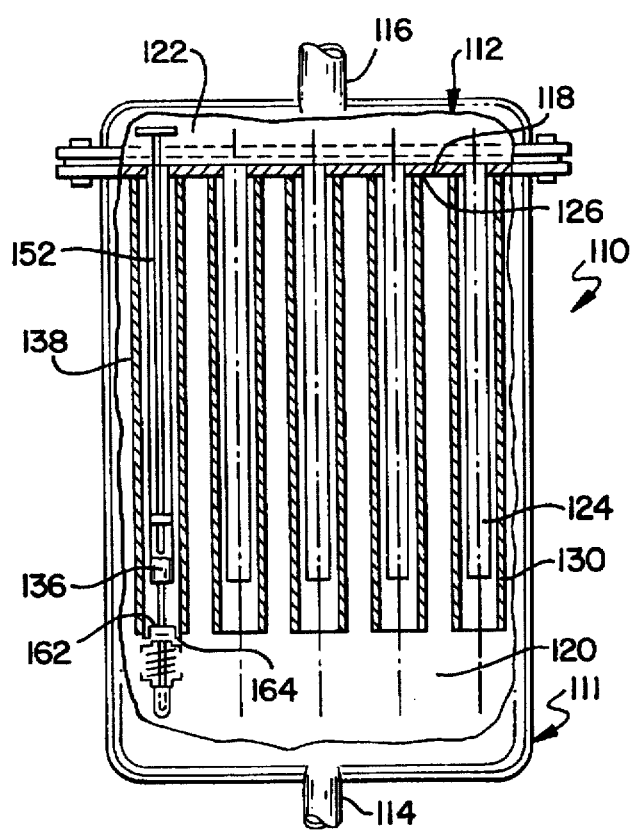
FIG. 4 is an elevational view of an exemplary upflow filter vessel, having a plurality of filter elements therein, and having a portion of the vessel side wall removed for clarity of illustration, showing an alternate embodiment of the quick-disconnect mount.
Figure 6:
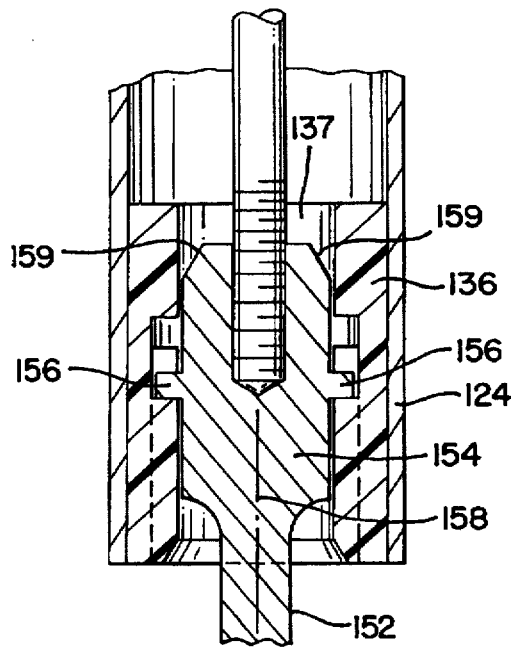
FIG. 6 is a partial cross-sectional view of the quick disconnect filter mount of FIG. 4.
Figure 5:
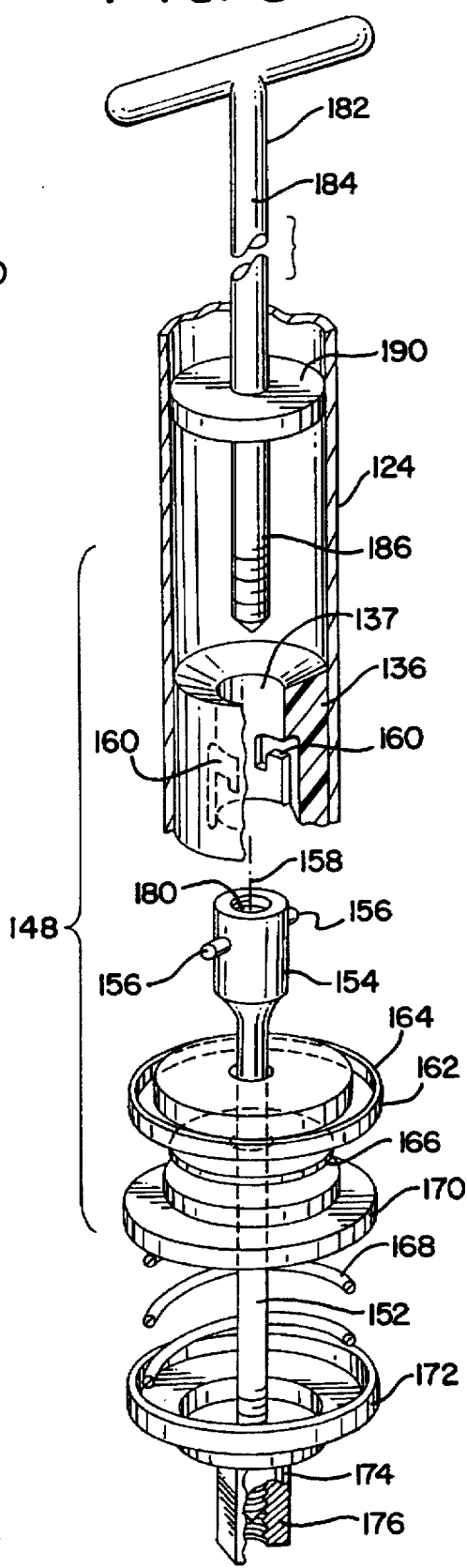
FIG. 5 is an exploded view, shown with various components in partial cross-section, of the quick disconnect filter mount of FIG. 4.

An alternate embodiment of the quick connect assembly 148 is illustrated in FIGS. 4–6, in which the assembly 148 is used to mount filter elements 138 in an up-flow type liquid filter 110. The up-flow filter 110 is similar to the down-flow filter 10 and includes an inlet nozzle 114 and an outlet nozzle 116. As provided previously, the inlet nozzle 114 is at or near the bottom of the vessel 111, and the outlet nozzle is located at or near the top of the vessel 112. A tube sheet or bulkhead 118 separates and defines an influent chamber 120 and a filtrate chamber 122, in communication with the inlet and outlet nozzles 114, 116, respectively.

Support core elements 124 extend downwardly or depend from the bulkhead 118, and are attached thereto at a fixed end 126. A free end 130 of the core elements 124 extends into the influent chamber 120. The core elements are similar in construction to the core elements 24 illustrated in FIGS. 1–3, and are configured to support a filter element 138, similar to filter element 38. Each support core element 124 includes a barrel member 136 at the free end 130. The barrel member 136 defines a generally cylindrical annular space 137 therethrough.

The quick-disconnect assembly 148 is configured similar to the assembly 48 illustrated in FIGS. 1–3. The quick-disconnect assembly includes a an elongated post 152, such as a threaded stud, having a retaining body 154 positioned on an end thereof. The retaining body 154 has a generally cylindrical shape and has a pair of pin-like projections 156 extending therefrom, generally transverse to the longitudinal axis of the retaining body 154, shown at 158. The body 154 includes a bevelled portion 159 at a distal end thereof to facilitate insertion into the barrel member 136.

The retaining body 154 is adapted to be releaseably received in the barrel member 136 at the free end 130 of the support core 124. In one embodiment, as best seen in FIG. 5, the barrel 136 has a pair of notches 160 formed therein, such as the exemplary hook-shaped or S-shaped notches, adapted to engage the pins 156.

The quick-disconnect assembly 148 is biased to retain the filter element 138 in place in engagement with the bulkhead 118, and to provide a pre-load compression on the filter element 138. The pre-load may be set one time, during the initial installation of a filter element 138, and can be left for prolonged periods of filter 110 operation, with the assurance that the filter element 138 has the proper compressive force exerted on it to retain it in place in the vessel 112 and to maintain the appropriate seals between the filter element 138 and the tube sheet 118 and the filter element 138 and the mount assembly 148.

The quick-disconnect assembly 148 further includes an inner seat plate 162, positioned on the post 152. The inner seat plate 162 has a rim 164 which is configured 16 engage the filter element 138, and to exert a compressive force on the element 138 to form a seal therebetween. Consequently, when the inner seat plate 162 is compressed against the element 138, it also exerts a force on the element 138 retaining it in place in engagement with the bulkhead 118.

The quick-disconnect assembly 148 further includes a seal member 166, such as a gasket, positioned on the post 152, adjacent to the seat plate 162. The seal member 166 seals the area around the connection between the post 152 and seat plate 162, and prevents leakage of fluid into the central opening of the filter element 138. The assembly 148 also includes a biasing member, such as a coil spring 168, positioned on the post 152, to provide the constant or settable compressive load on the filter element 138.

The spring 168 is retained in place on the post 152 by a spring seat 170 adjacent to the seal member 166 and the inner seat plate 162 at one end of the spring 168, and an outer seat plate 172 positioned at the other end of the spring 168, enclosing the spring 168 ends. Tensioning elements, such as a coupling nut 174 and an extension nut 176 may be threaded onto the post 152, adjacent to the outer seat plate 172 to permit the assembly 148 to be readily set at the proper pre-load compression to be exerted on the filter element 138.

In this embodiment, the retaining body 154 includes a threaded bore 180 therein, which is coaxial with axis 158. The bore 180 is configured to engage a removal tool, such as the exemplary long handled tool 182. The tool 182 includes an elongated body 184 having a threaded end 186 adapted to engage the bore 180. The removal tool 182 may include a T-shaped handle 188 to facilitate handling the tool 182 and to facilitate threading the end 186 into the bore 180 in the body 154. To more easily align the threaded end 186 with the bore 180, the tool 182 may include a guide member 190, such as a guide disk, formed of plastic or the like. The removal tool 182 is configured to extend into the center of the support core 124, through the bulkhead 118, to thread into the bore 180, so that the assembly 148 can be removed from the filtrate chamber 122 side of the bulkhead 118.

In use, the removal tool 182 is inserted into the support core 124 from the above the bulkhead 118. The end 186 is inserted and threaded into the bore 180. An upward force is exerted on the tool 182 and thus the retaining body 154, and the retaining body 154 is rotated, using the tool 182, until the pins 156 disengage from the notches 160. The assembly 148 can then be disengaged from the tool 182, by rotating the tool, and the assembly 148 and filter element 138 can be left to fall to the bottom of the vessel 112.

The upflow arrangement may be used in those instances where it is desirable for the filter elements to remain under water while the elements 138 are being removed from their respective cores 124, such as in the nuclear industry, wherein the water provides additional moderation of radiation which may be emitted from the filter elements 138.

Although illustrated with a cartridge type filter elements 38, 138 the present quick-disconnect assemblies 48, 148 may also be use with other types of support cores and septa, such as wire wound elements and pre-coat type elements.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A liquid filter comprising:
    a pressurized vessel having an untreated liquid inlet and a treated liquid outlet;
    a tube sheet spanning a portion of said vessel and defining an influent chamber communicating with said inlet and a filtrate chamber communicating with said outlet;
    a plurality of elongated filter support cores extending into said influent chamber and connected at a first, fixed end to said tube sheet, each of said support cores having a barrel member positioned thereon at about a second, free end thereof distal most from said tube sheet, each of said barrel members defining a cylindrical annular opening therethrough and including at least a pair of retaining notches formed therein contiguous with the annular opening;
    a plurality of elongated porous filter elements, each having a central opening therein for receipt of a respective support core therethrough; and
    a quick-disconnect mounting assembly for releasably mounting said element to said tube sheet, comprising:
    an elongated post having a generally cylindrical retaining body at a first end thereof, the retaining body having at least a pair of pin-like projections extending therefrom generally transverse to a longitudinal axis of said body, and being releasably connected to said barrel member by engagement of said pin-like projections with said retaining notches;
    an inner seat plate positioned on said post adjacent to said retaining body for engaging said filter element at an end thereof distal most from the tube sheet,
    a seal member positioned on said post adjacent to and abutting said inner seat plate to form a seal about said post;
    a spring seat positioned on said post adjacent to said seal;
    a spring element positioned on said post, adjacent to said spring seat;
    an outer seat plate positioned on said post adjacent to said spring to retain said spring in place within said mounting assembly; and
    at least one tensioning element, threadedly engaged with said post, abutting said outer seat plate, wherein said tensioning element is settable to apply a compressive load on said filter element to retain said filter element in engagement with said tube sheet and said mounting assembly, said mounting assembly being readily mountable to said core by applying a pressure thereto and rotating said mounting assembly to engage said pin-like projections with said retaining notches, and said mounting assembly being readily disengageable from said core by applying a pressure thereto and rotating said mounting assembly to disengage said pin-like projections from said retaining notches.

2. The liquid filter of claim 1 wherein said quick-disconnect assembly includes first and a second tensioning elements, said first tensioning element being settable to exert said compressive load on said filter element, and said second tensioning element abutting said first tensioning element to retain said first element at said compressive load setting.

3. The liquid filter of claim 1 wherein said retaining body includes a beveled portion at a distal end thereof to facilitate inserting said retaining body into said barrel member.

4. The liquid filter of claim 1 wherein said retaining body includes a threaded bore therein, coaxial with a longitudinal axis of said body, and wherein said bore is adapted to engage a removal member having a threaded end, said mounting assembly being readily disengageable from said core by threadedly engaging said removal member with said retaining body, applying a force on said removal member and rotating said mounting assembly to disengage said pin-like projections from said retaining notches.

5. The liquid filter of claim 4 wherein said removal member includes a guide member adapted to align said threaded end with said bore when said removal member is inserted into said core support for removal of said quick-disconnect mounting assembly.

6. The liquid filter of claim 1 wherein said first, fixed end is at an elevation above said second, free end.

7. The liquid filter of claim 1 wherein said first, fixed end is at an elevation below said second, free end.

\* \* \* \* \*